United States Patent [19]

Orii et al.

[11] 4,292,426

[45] Sep. 29, 1981

[54] PROCESS OF PRODUCING HYDROXYPROPYL CELLULOSE

[75] Inventors: Seiji Orii, Nakagomura; Yukio Sasagawa, Arai; Akinori Ito, Joetsu; Maruyama, Hiromi; Yoshiteru Sakai, both of Nakagomura, all of Japan

[73] Assignee: Nippon Soda Company Limited, Tokyo, Japan

[21] Appl. No.: 147,639

[22] Filed: May 7, 1980

[30] Foreign Application Priority Data

Jun. 15, 1979 [JP] Japan .................................. 54/75440

[51] Int. Cl.$^3$ ............................................. C08B 11/00
[52] U.S. Cl. ..................................... 536/95; 106/189
[58] Field of Search .................................... 536/95, 96

[56] References Cited

U.S. PATENT DOCUMENTS 3,131,176  4/1964  Klug ....................................... 536/96
3,131,177  4/1964  Klug et al. ............................ 536/96

OTHER PUBLICATIONS

Chemical Abstracts, vol. 82, No. 10, Mar. 10, 1975, p. 60310d.

Primary Examiner—Ronald W. Griffin
Attorney, Agent, or Firm—George B. Oujevolk

[57] ABSTRACT

Hydroxypropyl cellulose having superior solubility in isopropyl alcohol is obtained by reacting an alkali cellulose of unusually low NaOH/cellulose and water/cellulose ratios with propylene oxide in two stage successive reactions interposing an addition of water.

4 Claims, No Drawings

PROCESS OF PRODUCING HYDROXYPROPYL CELLULOSE

BACKGROUND OF THE INVENTION

The present invention relates to a process of producing hydroxypropylcellulose by a reaction of an alkali cellulose with propylene oxide.

DESCRIPTION OF THE PRIOR ART

Hydroxylpropyl cellulose is a nonionic cellulose ether characterized by its solubility in a number of solvents, and due to its solubility in alcohols and giving viscous solutions, hydroxylpropyl cellulose (hereinafter referred to as "HPC") has been used as a binder, granulating agent and film coating for pharmaceuticals. According to PHARMACOPOEIA JAPONICA, EDITIO OCTAVA, VOLUMEN II (HYDROXYPROPYL-CELLULOSUM), HPC for pharmaceutical use must not only be soluble in methanol, ethanol or isopropanol to give viscous solutions, but also the solutions musthave excellent transparency.

Japanese published examined patent application No. 32676/1976 discloses a process of preparing HPC having excellent solubility in a large number of polar organic solvents, and the process comprises mixing of comminuted cellulose material, alkali, water and an inert organic diluent, removing of excess liquid from the cellulose to obtain an alkali cellulose having a low alkali/cellulose ratio and a low water/cellulose ratio, then causing the alkali cellulose to react with propylene oxide and continuing the etherification to an M.S. (Molar Substitution) of at least 2.

According to the above-mentioned process, the product HPC does not become soluble but gives stable dispersion in isopropyl alcohol even for HPC having M.S. of 3.1. Further in the preparation of the alkali cellulose, the process uses voluminous comminuted cellulose which is difficult to handle, and employs a large amount of the diluent which must be recovered.

SUMMARY OF THE INVENTION

It is an object of the present invention to provide a process of producing HPC which is soluble in isopropyl alcohol, and wherein the solution is also excellent in its transparency.

It is another object of the present invention to provide a process of producing the isopropyl alcohol soluble HPC, said process being improved in the preparation of the alkali cellulose.

The foregoing and other objects of the present invention have been attained by a process which comprises steps of:

(a) swelling of cellulose with an aqueous sodium hydroxide solution containing 10-50 w % of NaOH, (b) driving out excess aqueous caustic soda solution from the swollen cellulose to prepare a dehydrated cellulose, (c) obtaining an alkali cellulose having the NaOH/cellulose ratio of 0.05-0.16 and the water/cellulose ratio of 0.2-0.5 by washing the dehydrated cellulose with an aqueous caustic soda solution containing less than 7 w % of caustic soda, and subsequent drying of the washed cellulose, (d) reacting the alkali cellulose with propylene oxide in the presence of an inert diluent until M.S. of the reactant becomes higher than 1 but lower than 2, (e) adding to the reaction mixture 0.2-0.7 parts of water per one part of cellulose in the raw material alkali cellulose, and (f) continuing further the etherification reaction until M.S. of the reactant becomes higher than 2.5.

DETAILED DESCRIPTION OF THE PREFERRED EMBODIMENTS

The cellulose used in this invention is preferably sheets of chemical cellulose (purified linter or wood pulp that has been sheeted on a paper machine).

The cellulose is immersed in an aqueous solution of caustic soda containing 10-50% of NaOH. Since the treatment of cellulose with the alkali solution is not only for swelling adequately of the cellulose but also for dissolving such impurities as hemicellulose with the strong base, it is necessary that the concentration of alkali be stong enough above about 10%, but a too strong alkali solution of above about 50% presents difficulty in the handling. Preferable concentration of the alkali solution is from about 15% to 25%.

From the alkali-treated cellulose, excess alkali solution is driven out by means of, for example, a press so as to make the weight of the pressed mass is about 2-3 times that of the raw material cellulose.

For the steps of the swelling of cellulose with an alkali solution and driving out of excess alkali solution from the swollen cellulose, the steeping technology of the viscose industry can be preferably employed. For example, when sheets of pulp are immersed in an alkali solution of 15-20% for 1-1.5 hours at 15°-45° C., and then the swollen sheets are compressed with a press under the press ratio of 2-3, the resulted dehydrated cellulose has usually a composition of about 14-16% alkali and about 30-45% cellulose.

The dehydrated cellulose is washed with a diluted aqueous alkali solution containing less that 7% of caustic soda to reduce the alkali content of the dehydrated cellulose. This step is achieved, for example, by repeated steeping and pressing of the dehydrated cellulose in the diluted alkali solution which has preferably about 0-4% of alkali concentration. The alkali-reduced cellulose is then dried with, for example, warm air of about 30°-50° C. to reduce its water content.

The alkali cellulose to be reacted upon with propylene oxide (hereinafter referred to as "PO") in the present invention must have the NaOH/cellulose ratio of 0.05-0.16, preferably 0.08-0.12 and the water/cellulose ratio of 0.2-0.5, preferably 0.25-0.45, and the reason is as follows. As to the NaOH/cellulose ratio, the M.S. of the reactant does not increase above 2 when the value is below 0.05, and the byproduct polypropylene glycol formation increases when the value is over 0.16. As to the water/cellulose ratio, the reaction of PO with the alkali cellulose does not proceed well when the value is below 0.2, and the byproduct polypropylene glycol formation increases when the value is over 0.5.

In the present invention, the alkali cellulose is characteristically reacted with PO in two stages in the presence of an inert diluent. The diluent is substantially inert under the reaction conditions described hereafter, and examples of the diluent are such hydrocarbons as hexane, heptane, benzene, toluene, propyl alcohol and butyl alcohol and mixtures thereof, and the amount is about 1.5-3 times that of the alkali cellulose weight.

In the first stage reaction which is aimed chiefly to cause etherification at the primary OH, about 4-10 moles of PO per anhydroglucose unit of the alkali cellulose is reacted at about 50°–100° C. until M.S. of the reactant reaches to greater than 1 but less than 2, preferably 1.5–2.

Before proceeding to the second stage reaction which is aimed chiefly to cause etherification at the secondary OH, 0.2–0.7 parts, preferably 0.3–0.6 parts, of water per one part of cellulose in the alkali cellulose is added to the reaction mixture of the first stage reaction. Amount of water smaller than 0.2 parts causes a product HPC of poor solubility in polar organic solvents, and that larger than 0.7 parts decreases the efficency of etherification.

The second stage reaction is carried out at around the same temperature as the first reaction under the existence of about 1–8 moles of PO per anhydroglucose unit of the initial alkali cellulose until M.S. of the reactant reaches to greater than 2.5, preferably 3–4.

The reaction mixture thus obtained is processed to prepare the purified HPC in accordance with such known procedures as adding the reaction mixture to hot water to precipitate crude HPC and to flash off the volatile diluent, neutralizing the hot water containing the crude HPC with a weak acid, washing of the resulted HPC with hot water, and drying of the purified HPC.

In accordance with the process of the present invention, it is possible to prepare HPC soluble clearly in isopropyl alcohol, and no diluent is required for the alkali cellulose preparation step.

The present invention will be further illustrated by certain examples which are provided for purposes of illustration only and not intended to be limiting the present invention.

EXAMPLE 1

Using a steeping machine employed in the viscose industry, sheets of wood pulp were immersed in 22% of aqueous solution of NaOH for one hour at room temperature, and then the swollen cellulose was pressed with the press ratio of 2.3 to obtain a dehydrated cellulose having the NaOH/cellulose ratio of 0.38 and the water/cellulose ratio of 1.1. The dehydrated cellulose was washed with 0.5% aqueous solution of NaOH to obtain an alkali-reduced cellulose having the NaOH/-cellulose ratio of 0.08 and the water/cellulose ratio of 2.0. The alkali-reduced cellulose was broken up and dried with warm air of 40° C. to make the water/cellulose ratio to 0.2. The resulted alkali cellulose was used as the raw material for the etherification reaction mentioned hereafter.

130 parts of the alkali cellulose was mixed with a diluent composed of 180 parts of n-hexane and 30 parts of t-butyl alcohol, and the mixture was reacted with 200 parts of PO at 70° C. for 4 hrs. under nitrogen atmophere. The etherified cellulose produced at the end of the first stage reaction had the M.S. of 1.6. To the reaction system was added 50 parts of water, which corresponded to 0.39 parts per part of cellulose in the raw material alkali cellulose. After adding further 80 parts of PO to the reaction system, the second stage reaction was continued at 70° C. for 1.5 hrs. The final reaction mixture was treated to obtain purified HPC with flashing off of the diluent, neutralization with a weak acetic acid, washing with water and drying. The purified HPC having the M.S. of 2.8 was obtained.

The product was soluble in isopropanol and the 2% solution had the transparency of 97 %*.

* Transmittance of the 2% solution measured with a spectrophotometer equipped with a 430 mµfiler, wherein 100% transparency was set forisopropanol.

EXAMPLE 2

In the same way as the process of Example 1, another experiment was carried out. Sheets of wood pulp were swollen with 17% aqueous solution of NaOH for 1.5 hrs. at room temperature, then pressed with the press ratio of 2.1 to obtain a dehydrated cellulose having the NaOH/cellulose ratio of 0.33 and the water/cellulose ratio of 1.0. The dehydrated cellulose was washed with 1.5 % aqueous solution of NaOH to obtain an alkali-reduced cellulose having the NaOH/cellulose ratio of 0.12 and the water/cellulose ratio of 2.3. The alkali-reduced cellulose was dried at 40° C. to bring the water/cellulose ratio to 0.35.

To 130 parts of the alkali cellulose was added a diluent composed of 200 parts of n-hexane and 50 parts of t-butyl alcohol, and the mixture was reacted with 210 parts of PO at 80° C. for 3.5 hrs. to obtain a product of M.S. 1.8. After adding 63 parts of water and 90 parts of PO to the reaction system, the second stage reaction was continued at 80° C. for 2 hrs. to obtain a purified HPC having the M.S. of 3.4.

The transparency of the 2 % solution in isopropanol was 99 %.

EXAMPLE 3

In the same way with the process of Example 1, another experiment was carried our. Sheets of wood pulp were swollen with 19 % aqueous solution of NaOH for 1 hour at room temperature, then pressed with the press ratio of 2.3 to obtain a dehydrated cellulose having the NaOH/cellulose ratio of 0.36 and the water/cellulose ratio of 1.14. The dehydrated cellulose was washed with 1 % aqueous solution of NaOH to obtain an alkali-reduced cellulose having the NaOH/cellulose ratio of 0.1 and the water/cellulose ratio of 2.1. The alkali-reduced cellulose was dried at 40° C. to make the water/cellulose ratio to 0.3.

130 parts of the alkali cellulose was mixed with a diluent composed of 230 parts of n-hexane and 28 parts of t-butyl alcohol, and the mixture wasreacted with 230 parts of PO at 80° C. for 3 hrs. to obtain a product of M.S. 1.9. After adding 56 parts of water and 99 parts of PO to the reaction system, the second stage reaction was continued at 80° C. for 2 hrs. to obtain a purified HPC having the M.S. of 3.5.

The transparency of the 2 % solution in isopropanol was 99 %.

What is claimed is:
1. A process of producing hydroxypropyl cellulose which comprises
  (a) swelling of cellulose with an aqueous sodium hydroxide solution containing 10–50 w% of NaOH.
  (b) driving out excess aqueous caustic soda solution from the swollen cellulose to prepare a dehydrated cellulose,
  (c) obtaining an alkali cellulose having the NaOH/-cellulose ratio of 0.05–0.16 and the water/cellulose ratio of 0.2–0.5 by washing the dehydrated cellulose with an aqueous caustic soda solution containing less than 7 w% of caustic soda, and subsequent drying of the washed cellulose,
  (d) reacting the alkali cellulose with propylene oxide in the presence of an inert diluent until M.S. of the reactant reaches to greater than 1.5 but less than 2,

(e) adding to the reaction mixture 0.2–0.7 parts of water per one part cellulose in the raw material alkali cellulose, and (f) continuing further the etherification reaction until M.S. of the reactant reaches to greater than 2.5.

2. A process as claimed in claim 1, wherein said alkali cellulose is prepared by swelling cellulose with an aqueous sodium hydroxide solution containing 15–25 w% of NaOH, driving out excess aqueous caustic soda solution from the swollen cellulose, washing the dehydrated cellulose with an aqueous caustic soda solution containing 0–4 w% of NaOH, and drying the washed cellulose to obtain the alkali cellulose having the NaOH/cellulose ratio of 0.08–0.12 and the water/cellulose ration of 0.25–0.45.

3. A Process as claimed in claim 1, said reaction is interrupted when M.S. of the reactant reaches to 1.5–2, and 0.3–0.6 parts of water per one part of cellulose in the raw material alkali cellulose is added, and then the reaction is continued until M.S. of the reactant reaches to 3–4.

4. A process as claimed in claim 3, said alkali cellulose is reacted with propylene oxide in the presence of an inert diluent composed of hexane and t-butyl alcohol.

* * * * *